(12) United States Patent
Entov et al.

(10) Patent No.: US 7,819,181 B2
(45) Date of Patent: Oct. 26, 2010

(54) METHOD AND AN APPARATUS FOR EVALUATING A GEOMETRY OF A HYDRAULIC FRACTURE IN A ROCK FORMATION

(75) Inventors: Vladimir Mordukhovich Entov, Moscow (RU); Yury Nikolaevich Gordeev, Moscow (RU); Evgeny Mikhailovich Chekhonin, Moscow (RU); Marc Jean Thiercelin, Ville d'Avray (FR)

(73) Assignee: Schlumberger Technology Corporation, Cambridge, WA (US)

( * ) Notice: Subject to any disclaimer, the term of this patent is extended or adjusted under 35 U.S.C. 154(b) by 572 days.

(21) Appl. No.: 11/763,584

(22) Filed: Jun. 15, 2007

(65) Prior Publication Data
US 2007/0256830 A1  Nov. 8, 2007

Related U.S. Application Data

(63) Continuation-in-part of application No. 10/872,116, filed on Jun. 18, 2004, now abandoned.

(30) Foreign Application Priority Data

Jul. 25, 2003  (RU) .............................. 2003123596

(51) Int. Cl.
*E21B 49/08* (2006.01)
(52) U.S. Cl. ...................... 166/66; 166/250.01; 324/353
(58) Field of Classification Search .............. 166/250.1, 166/66; 324/357, 353, 347, 366
See application file for complete search history.

(56) References Cited

U.S. PATENT DOCUMENTS 3,496,768 A * 2/1970 Boucher .................. 73/152.41

| 4,427,944 A | 1/1984 | Chandler |
| 5,151,658 A | 9/1992 | Muramatsu et al. |

(Continued)

FOREIGN PATENT DOCUMENTS

EP  0043768 A1  1/1982

(Continued)

OTHER PUBLICATIONS

Armstrong et al., "Advanced Fracturing Fluids Improve Well Economics", Oilfield Review vol. 7 (3) pp. 34-51, 1995.

(Continued)

*Primary Examiner*—Daniel P Stephenson
(74) *Attorney, Agent, or Firm*—Brigid Laffey; James McAleenan; Vincent Loccisano

(57) ABSTRACT

The methods of evaluating a geometry of a hydraulic fracture in a rock formation penetrated by a borehole comprises the steps of measuring the values of electric or magnetic fields, or both electric and magnetic fields generated due to the electrokinetic effect by the flow of an electrolyte-based fracturing fluid from the borehole into the fracture and from the fracture into the formation or by the reverse flow of the fluid from the rock formation and from the fracture into the borehole and determining the geometry of the fracture from the measured values. The methods may provide for varying the injection pressure, varying the value of the electrokinetic coupling coefficient of the fracturing fluid or applying at least one pressure pulse of a given magnitude to the fracturing fluid.

43 Claims, 9 Drawing Sheets

U.S. PATENT DOCUMENTS

| | | | |
|---|---|---|---|
| 5,519,322 | A | 5/1996 | Pozzi et al. |
| 5,642,051 | A | 6/1997 | Babour et al. |
| 5,841,280 | A * | 11/1998 | Yu et al. .................... 324/323 |
| 6,330,914 | B1 * | 12/2001 | Hocking et al. .......... 166/250.1 |
| 6,441,618 | B2 | 8/2002 | Rossi et al. |
| 6,462,549 | B1 | 10/2002 | Curtis et al. |
| 6,597,178 | B1 | 7/2003 | Nichols et al. |
| 6,622,093 | B1 | 9/2003 | Fujinawa et al. |
| 7,388,380 | B2 * | 6/2008 | Chen et al. .................. 324/347 |
| 2009/0166024 | A1 * | 7/2009 | Chen et al. .................... 166/66 |
| 2009/0167310 | A1 * | 7/2009 | Smits ......................... 324/353 |
| 2009/0242274 | A1 * | 10/2009 | Chen et al. .................... 175/50 |

FOREIGN PATENT DOCUMENTS

| | | |
|---|---|---|
| EP | 0544583 B1 | 12/1995 |
| EP | 0715187 B1 | 7/2001 |
| GB | 2349222 A | 10/2000 |

OTHER PUBLICATIONS

Barree et al., A practical Guide to Hydraulic Fracture Diagnostic Technologies, SPE 77442, 2002.

Bessonov L.A., "Theoretical Foundations of Electrotechnics. Electromagnetic Field". 8th ed. M.: Vysshaya Shkola Publ., 1986 (in Russian), pp. 240-248, 99-103, 174-178, 121-122, 130-145.

Cipolla et al., State-of-the-Art in Hydraulic Fracture Diagnostics, SPE 64434, 2000.

Coelho et la., Electroosmotic phenomena in porous median, Journal of Colloid and Interface Science, 181, 169-190, 1996.

Dukhin et al., Surface and Colloid Science, vol. 7, Electrokinetic phenomena, Editor: Egon Matijevic, John Wiley & Sons, pp. 52-76, 1974.

Ishido et al., "Experimental and theoretical basis of electrokinetic phenomena in rock-water systems and its application to geophysics", Journal of Geophysical Research, vol. 86, No. B3, 1763-1775, Mar. 10, 1981.

Jouniaux et al., "Permeability dependence of streaming potential in rocks for various fluid conductivities", Geophysical Research Letters, vol. 22, No. 4, 485-488, Feb. 15, 1995.

Jouniaux et al., "Detection of fluid flow variations at the Nankai Trough by electric and magnetic measurements in boreholes or at the seafloor", Journal of Geophysical Research, vol. 104, No. B12, pp. 29.293-29.309, Dec. 10, 1999.

Jouniaux et al., "Streaming potential in volcanic rocks from Mount Pelee", Journal of Geophysical Research, vol. 105, No. B4, pp. 8391-8401, Apr. 10, 2000.

Friedrichsberg D.A., "Course of Colloid Chemistry", L. "Khimia" publ. 1984 (in Russian), pp. 206-236.

Landau et al., Electrodynamics of continuous media, Landau and Lifshitz Course of Theoretical Physics, vol. 8, Chapter IV, "Static Magnetic Field" pp. 105-129, Pergamon Press plc, 1960.

Morgan et al., "Streaming potential properties of Westerly granite with applications", Journal of Geophysical Research, vol. 94, No. B9, 12.449-12.461, Sep. 10, 1989.

Overbeek, "Electrochemistry of the double layer", in: Colloid Science, edited by H. R. Kruyt, pp. 115-193, Elsevier, New York, 1952.

Savel'ev I.V. General Physics, Book 2: Electricity and Magnetism, M.: AST-Publ. 2000 (in Russian), pp. 119-120, 140-142, 329-330, 236-245, 327-328.

Economides et al., "Reservoir Stimulation", pp. 9-1-9-63 entitled "Fracture Evaluation using Pressure Diagnostics", Third Edition, Chichester, UK, Wiley (2000).

Etchecopar et al. Harnessing paleomagnetics for logging, Oilfield Review, vol. 5, No. 3, pp. 4-13, 1993.

* cited by examiner

METHOD AND AN APPARATUS FOR EVALUATING A GEOMETRY OF A HYDRAULIC FRACTURE IN A ROCK FORMATION

CROSS-REFERENCE TO RELATED APPLICATION

This application is a continuation-in-part application of application Ser. No. 10/872,116, filed Jun. 18, 2004. Application Ser. No. 10/872,116 claims the benefits of priority of Russian Application No.: 2003123596, filed Jul. 25, 2003 both of which are hereby incorporated by reference herein in their entirety.

FILED OF THE INVENTION

The present invention relates to a method and an apparatus for evaluating the shape or geometry of hydraulic fractures in rock formations. It can be advantageously applied to determine the shape of fractures in subterranean formations penetrated by oil or gas wells.

BACKGROUND OF THE INVENTION

Hydraulic fracturing is generally used to stimulate production of hydrocarbons from hydrocarbon wells. Hydraulic fractures are created in subterranean formations by injecting high viscosity fluid (also referred to as fracturing fluid) at a high flow rate into well boreholes. The tensile fractures thus-created can be about 100 m long. The fracturing procedure generally takes from about 30 minutes to 4 hours.

In order to create a high hydraulic conductivity drain in the formation, the fracturing fluid usually contains proppant, small particles which are added to the fluid to keep the fracture open once the injection is stopped and pressure is reduced. These particles can be sand grain or ceramic grains. The width of the fracture during propagation is about 1 cm, and 4 mm once closed on proppant.

To be efficient, the fracture should be contained within the reservoir formation and not propagate into the adjacent layers. It should also be of sufficient length and width. Evaluation of the geometry of the fracture is therefore an important step to ensure treatment optimization.

Fracture geometries can be evaluated utilizing various techniques and methodologies. The mostly widely used is a method of indirect evaluation based on analysis of the pressure response during the fracture treatment and subsequent production. The method is described, for example, in *Reservoir Stimulation*, Third Edition, M. J. Economides and K. G. Nolte (Ed.), Chichester, UK, Wiley, (2000). This approach provides, however, only very general information about fracture length and fracture width and does not provide any information about the exact fracture geometry. More reliable acoustic fracture imaging technology for field applications can be based on event location using passive acoustic emission. Such technology is described, for example, in *A practical guide to hydraulic fracture diagnostic technologies*, by D. Barree, M. K. Fisher and R. A. Woodroof, paper SPE 77442, presented at the SPE Annual Technical Conference and Exhibition held in San Antonio, Tex., USA, 28 Sep. to 2 Oct. 2002. Acoustic emission events generated by micro-earthquakes around the fracture during hydraulic fracturing are recorded by an array of geophones or accelerators placed in adjacent boreholes. The micro-earthquakes may be caused by the high stress concentration ahead of the fracture or by the decrease of effective stress around the fracture following fracturing fluid leak-off into the formation. In the best cases, the events can be analyzed to provide some information about the source mechanism (energy, displacement field, stress drop, source size, etc.). However, they do not provide direct quantitative information on the fracture. The approach is commonly used in the field and is particularly suited for the estimation of fracture azimuth and dip, but not for an accurate determination of the position of the fracture tip. Another disadvantage of the approach is that the micro-earthquakes are spread around the fracture and produce a cloud of events, which do not allow a precise determination of the fracture geometry.

Yet another technique for evaluating hydraulic fracture shapes is tiltmeter mapping, also discussed in the paper by D. Barree, et al. referenced above. This technique involves monitoring the deformation pattern in the rock surrounding the fracture. An array of tiltmeters measures the gradient of the displacement (tilt) field versus time. The induced deformation field is primarily a function of fracture azimuth, dip, depth to fracture middle point and total fracture volume. The shape of the induced deformation field is almost completely independent of reservoir mechanical properties and formation stress state, if the rock is homogeneous.

Disadvantages of this technique are first of all in that surface tiltmeters cannot accurately resolve fracture length and height due to the depth of the fracture below the surface since the measurement distance is large compared to the fracture dimensions. Although downhole tiltmeters placed in the treatment borehole can provide better information on the fracture height they still cannot resolve the fracture length.

The above-mentioned techniques are based on observation of perturbations of mechanical fields, such as a reservoir pressure field and a rock deformation field caused by a hydraulic fracture. The present invention relies on perturbations of the electric and magnetic fields generated due to the electrokinetic effect by a fluid flow within a reservoir in a vicinity of a hydraulic fracture.

The electrokinetic effect is a fundamental physico-chemical phenomenon of generation of an electric current by the fluid flow through a permeable medium, or through a narrow channel, such as a fracture. Its primary cause is the difference in mobility of ions, some of which are fixed at the surface of the solid skeleton (matrix) of the porous medium, or the channel walls, while counter-ions in solution can move with the pore fluid, (or force it to move, if an electric field is applied; such a flow is referred to as electroosmotic flow, see for example Coelho, D., M. Shapiro, J. F. Thovert, and P. M. Adler, "Electro-osmotic phenomena in porous media", J. of Colloid and Interface Science, 181, 169-190, 1996).

This approach is very different from approaches which rely on the injection of an electric current which is generated at the surface and flows through a well casing inside a fracture, as described in U.S. Pat. No. 6,330,914 to Hocking and Wells. In U.S. Pat. No. 6,330,914 a fracture must be opened by a highly conductive fluid (i.e. low electrical resistivity) for the fracture to act as an "electrified sheet". The flow of a fracturing fluid is therefore intended for creating and propagating the fracture and does not directly relate to the creation of the electromagnetic field itself. The advantage of this method is the creation of a strong electro-magnetic field, but it requires a highly conductive fluid and might be limited in depth due to electric current leakage through the casing.

In U.S. Pat. No. 5,519,322 the effect is used to measure the permeability of a formation penetrated by a borehole by measuring the magnetic field generated by the flow of fluid injected into the formation. The permeability measured in this way provides information on the capacity of the reservoir to produce oils.

A need exists to provide approaches for evaluating shapes of hydraulic fractures in rock formations, which approaches mitigate or even exclude disadvantages and deficiencies explained above.

SUMMARY OF THE INVENTION

It is an object of the present invention to provide a method for evaluating fracture geometries in rock formations penetrated by oil or gas boreholes. An insight of the inventors was that the electrokinetic effect could be used to make such evaluations.

The term "fracture" as used herein covers a single fracture or a plurality of related fractures all caused by the same fracturing event.

In a first aspect the present invention provides a method of evaluating the geometry of a hydraulic fracture in a rock formation penetrated by a borehole, comprising the steps of:

placing a number of electric field sensors or magnetic field sensors or both electric and magnetic field sensors inside or around the borehole;

injecting into the borehole an electrolyte-based fracturing fluid at a pressure high enough to allow the fluid to create the fracture in the formation penetrated by the borehole and to flow from the borehole into the fracture and from the fracture into the formation so that a detectable electromagnetic field is generated by the flow of the fracturing fluid due to the electrokinetic effect;

measuring the values of electric or magnetic fields, or both electric and magnetic fields generated by the flow of the fracturing fluid from the borehole into the fracture and from the fracture into the formation due to the electrokinetic effect; and determining the geometry of the fracture from the measured values.

One embodiment of this aspect of the present invention provides for placing the electric field sensors or magnetic field sensors or both electric and magnetic field sensors on the earth's surface above the borehole.

Another embodiment of this aspect of the present invention provides for placing the electric field sensors or magnetic field sensors or both electric and magnetic field sensors inside an adjacent borehole.

The method may further comprise providing a model from which expected values of the electric or magnetic fields, or both electric and magnetic fields generated due to the electrokinetic effect by the flow of the fracturing fluid from the borehole into the fracture and from the fracture into the rock formation are calculated at the same positions or same times, or both same positions and times as that of the measured values, for various fracture geometries and injection pressures; wherein the geometry of the fracture is determined by adjusting the model to minimize the discrepancy between the expected and measured values.

In a second related aspect, the present invention provides for placing a number of electric field sensors or magnetic field sensors or both electric and magnetic field sensors inside or around the borehole;

injecting into the borehole an electrolyte-based fracturing fluid at a pressure high enough to allow the fluid to create a fracture in the formation penetrated by the borehole and to flow from the borehole into the fracture and from the fracture into the formation so that an electromagnetic field is generated by the flow of the fracturing fluid due to the electrokinetic effect;

varying the injection pressure to ensure that the electromagnetic field can be detected by the electric field sensors and magnetic field sensors or both electric and magnetic field sensors, measuring the values of electric or magnetic fields, or both electric and magnetic fields generated by the flow of the fracturing fluid from the borehole into the fracture and from the fracture into the formation due to the electrokinetic effect; and determining the geometry of the fracture from the measured values.

One embodiment of this aspect of the present invention provides for placing the electric field sensors or magnetic field sensors or both electric and magnetic field sensors on the earth's surface above the borehole.

Another embodiment of this aspect of the present invention provides for placing the electric field sensors or magnetic field sensors or both electric and magnetic field sensors inside an adjacent borehole.

In another embodiment of this aspect of the present invention the injection pressure is varied by changing the pump rate.

In another further embodiment of this aspect of the present invention the injection pressure is varied by changing the fracturing fluid viscosity.

The method may further comprise providing a model from which expected values of the electric or magnetic fields, or both electric and magnetic fields generated due to the electrokinetic effect by the flow of the fracturing fluid from the borehole into the fracture and from the fracture into the rock formation are calculated at the same positions or times, or both same positions and times as that of the measured values for various fracture geometries and injection pressures; wherein the geometry of the fracture is determined by adjusting the model to minimize the discrepancy between the expected and measured values.

In a third related aspect, the present invention provides a method of evaluating the geometry of a hydraulic fracture in a rock formation penetrated by a borehole, comprising the steps of:

placing a number of electric field sensors or magnetic field sensors or both electric and magnetic field sensors inside or around the borehole;

injecting into the borehole an electrolyte-based fracturing fluid with a given salinity and a given pH at a pressure high enough to allow the fluid to create a fracture in the formation penetrated by the borehole and to flow from the borehole into the fracture and from the fracture into the formation so that an electromagnetic field is generated by the flow of the fracturing fluid due to the electrokinetic effect;

varying the value of the electrokinetic coupling coefficient, coefficient which relates the value of induced voltage with the value of the pressure gradient for a given fluid flowing in a given medium, by changing the salinity of the fracturing fluid during the fracturing to ensure that the electromagnetic field can be detected by the electric field sensors or magnetic field sensors, or both electric and magnetic field sensors, measuring the values of electric or magnetic fields, or both electric and magnetic fields generated by the flow of the fracturing fluid due to the electrokinetic effect; and determining the geometry of the fracture from the measured values.

In another embodiment of this aspect of the present invention an electrolyte-based fracturing fluid is a high electric resistivity fluid.

One embodiment of this aspect of the present invention provides for placing the electric field sensors or magnetic field sensors or both electric and magnetic field sensors on the earth's surface above the borehole.

Another embodiment of this aspect of the present invention provides for placing the electric field sensors or magnetic field sensors or both electric and magnetic field sensors inside an adjacent borehole.

In one of the embodiments of this aspect of the invention the salinity of the fracturing fluid is changed by increasing the salt concentration in the fracturing fluid during the fracturing.

In another embodiment of this aspect of the present invention the salinity of the fracturing fluid is changed by decreasing the salt concentration in the fracturing fluid during the fracturing.

In one of the embodiments of this aspect of the present invention the value of electrokinetic coupling coefficient of the fracturing fluid while flowing in the formation is higher than that of the coupling coefficient of the formation fluid.

In another further embodiment of this aspect of the present invention the value of the electrokinetic coupling coefficient of the fracturing fluid while flowing in the formation is lower than that of the coupling coefficient of the formation fluid.

In another further embodiment of this aspect of the present invention the pressure in the borehole is varied to ensure that the electromagnetic field is detectable by the electric field sensors and magnetic field sensors.

The method may further comprise providing a model from which expected values of the electric or magnetic fields, or both electric and magnetic fields, generated due to the electrokinetic effect by the flow of the fracturing fluid from the borehole into the fracture and from the fracture into the formation, are calculated at the same positions or times, or both same positions and times as that of the measured values for various fracture geometries and injection pressures, wherein the geometry of the fracture is determined by adjusting the model to minimize the discrepancy between the expected and measured values.

In another further embodiment of this aspect of the present invention the salinity is changed by injecting an additional fracturing fluid with a salinity different from that of the original one.

In another further embodiment of this aspect of the present invention the salinity of the fracturing fluid is changed step by step during the fracturing.

In a fourth related aspect, the present invention provides a method of evaluating the geometry of a hydraulic fracture in a rock formation penetrated by a borehole, comprising the steps of:

placing a number of electric field sensors or magnetic field sensors or both electric and magnetic field sensors around the borehole;

injecting into the borehole an electrolyte-based fracturing fluid with a given salinity and a given pH at a pressure high enough to allow the fluid to create a fracture in the formation penetrated by the borehole and to flow from the borehole into the fracture and from the fracture into the formation so that an electromagnetic field is generated by the flow of the fracturing fluid due to the electrokinetic effect;

varying the value of the electrokinetic coupling coefficient by changing the pH of the fracturing fluid during the fracturing job;

measuring the values of electric or magnetic fields, or both electric and magnetic fields generated by the flow of the fracturing fluid due to the electrokinetic effect; and determining the geometry of the fracture from the measured values.

One embodiment of this aspect of the present invention provides for placing the electric field sensors or magnetic field sensors or both electric and magnetic field sensors on the earth's surface above the borehole.

The other embodiment of this aspect of the present invention provides for placing the electric field sensors or magnetic field sensors or both electric and magnetic field sensors inside an adjacent borehole.

Another embodiment of this aspect of the present invention provides for increasing the pH of the fracturing fluid during the fracturing job.

Another further embodiment of this aspect of the present invention provides for decreasing the pH of the fracturing fluid during the fracturing job.

The method may further comprise providing a model from which expected values of the electric or magnetic fields, or both electric and magnetic fields generated due to the electrokinetic effect by the flow of the fracturing fluid from the borehole into the fracture and from the fracture into the formation are calculated at the same positions or times, or both same positions and times as that of the measured values for various fracture geometries and injection pressures, wherein the geometry of the fracture is determined by adjusting the model to minimize the discrepancy between the expected and measured values.

In another further embodiment of this aspect of the present invention the pressure in the borehole is varied to ensure that the electromagnetic field is detectable by the electric field sensors and magnetic field sensors.

In another further embodiment of this aspect of the present invention the pH of the fracturing fluid is changed step by step during the fracturing job.

In a sixth related aspect, the present invention provides a method of evaluating a geometry of a hydraulic fracture in a rock formation penetrated by a borehole, comprising the steps of:

placing a number of electric field sensors or magnetic field sensors or both electric and magnetic field sensors inside or around the borehole;

injecting into the borehole an electrolyte-based fracturing fluid at a pressure high enough to allow the fluid to create the fracture in the formation penetrated by the borehole and to flow from the borehole into the fracture and from the fracture into the formation so that a detectable electromagnetic field is generated by the flow of the fracturing fluid due to the electrokinetic effect;

decreasing the pressure in the borehole thereby allowing the fluid to flow back from the formation and from the fracture into the borehole, measuring the values of electric or magnetic fields, or both electric and magnetic fields generated by the reverse flow of the fracturing fluid from the formation and from the fracture into the borehole due to the electrokinetic effect; and determining the geometry of the fracture from the measured values.

One embodiment of this aspect of the present invention provides for placing the electric field sensors or magnetic field sensors or both electric and magnetic field sensors on the earth's surface above the borehole.

The other embodiment of this aspect of the present invention provides for placing the electric field sensors or magnetic field sensors or both electric and magnetic field sensors inside an adjacent borehole.

The method may further comprise providing a model from which expected values of the electric or magnetic fields, or both electric and magnetic fields generated due to the electrokinetic effect by the reverse flow of the fracturing fluid from the formation and from the fracture into the borehole are calculated at the same positions or same times, or both same positions and times as that of the measured values for various fracture geometries and injection pressures;

wherein the geometry of the fracture is determined by adjusting the model to minimize the discrepancy between the expected and measured values.

In a sixth related aspect, the present invention provides a method of evaluating the geometry of a hydraulic fracture in a rock formation penetrated by a borehole, comprising the steps of:

placing a number of electric field sensors or magnetic field sensors or both electric and magnetic field sensors inside or around the borehole;

injecting into the borehole an electrolyte-based fracturing fluid with a given salinity and a given pH at a pressure high enough to allow the fluid to create a fracture in the formation penetrated by the borehole and to flow from the borehole into the fracture and from the fracture into the formation;

applying at least one pressure pulse of a given magnitude to the fracturing fluid under pressure that is sufficient to generate an electromagnetic field by the flow of the fracturing fluid due to the electrokinetic effect;

measuring the values of electric or magnetic fields, or both electric and magnetic fields generated by the flow of the fracturing fluid due to the electrokinetic effect; and determining the geometry of the fracture from the measured values.

One embodiment of this aspect of the present invention provides for placing the electric field sensors or magnetic field sensors or both electric and magnetic field sensors on the earth's surface above the borehole.

The other embodiment of this aspect of the present invention provides for placing the electric field sensors or magnetic field sensors or both electric and magnetic field sensors inside an adjacent borehole.

One of the embodiments of this aspect of the present invention provides for applying at least one positive pressure pulse of a given magnitude to the fracturing fluid so that the electromagnetic field is generated by the flow of the fracturing fluid from the borehole into the fracture and from the fracture into the formation due to the electrokinetic effect.

The other embodiment of this aspect of the present invention provides for applying at least one negative pressure pulse of a given magnitude to the fracturing fluid so that the electromagnetic field is generated by a reverse flow of the fracturing fluid from the formation and from the fracture into the borehole due to the electrokinetic effect.

The method may further comprise providing a model from which expected values of the electric or magnetic fields, or both electric and magnetic fields generated due to the electrokinetic effect by the flow of the fracturing fluid from the borehole into the fracture and from the fracture into the rock formation or by the reverse flow of the fracturing fluid from the formation and from the fracture into the borehole are calculated at the same positions or times, or both same positions and times as that of the measured values for various fracture geometries and injection pressures; wherein the geometry of the fracture is determined by adjusting the model to minimize the discrepancy between the expected and measured values.

One of the embodiments of this aspect of the present invention provides for applying a second pressure pulse with a magnitude different from that of the first one.

The other embodiment of this aspect of the present invention provides for applying a second pressure pulse opposite in sign to the first one.

In another further embodiment of this aspect of the present invention after the step of applying a pressure pulse the salinity is changed and then a second pressure pulse is applied.

A further aspect of the invention provides a computer system which is operatively configured to determine the geometry of a hydraulic fracture in a rock formation penetrated by a borehole from values of either electric or magnetic field, or both electric and magnetic fields generated by the flow of the electrolyte-based fracturing fluid from the borehole into the fracture and into the rock formation or the reverse flow of the fracturing fluid from the rock formation and from the fracture into the borehole due to the electrokinetic effect and measured by a number of electric or magnetic fields sensors or both electric and magnetic field sensors placed inside or around the borehole.

The invention also provides an apparatus for evaluating the geometry of a hydraulic fracture in a rock formation penetrated by a borehole, the apparatus comprising:

a rig comprising a pump for injecting an electrolyte-based fracturing fluid into the borehole at a pressure high enough to allow the fluid to create a fracture in the formation the borehole and to flow from the borehole into the fracture and from the fracture into the formation so that an electromagnetic field is generated by the flow of the fracturing fluid due to the electrokinetic effect, at least one downhole tool for measuring either the electric or the magnetic field, or both electric and magnetic fields generated by the flow of the fracturing fluid from the borehole into the fracture and into the rock formation or the reverse flow of the fracturing fluid from the rock formation and from the fracture into the borehole due to the electrokinetic and a computer system for determining the geometry of the fracture from the measured values of either the electric or the magnetic field, or both electric and magnetic fields.

The apparatus may comprise means for changing the fracturing fluid viscosity during the fracturing job to change the value of the pressure.

In relation to the apparatus embodiments, each downhole tool may be movable along the borehole. The means for injecting the fracturing fluid may be a surface pump. The apparatus itself may further comprise: at least one memory unit for storing expected values of the electric or the magnetic fields or both electric and magnetic fields for a given fracture geometry and injection pressure according to a measurement of the position and/or time; means for evaluating the location of the downhole tool in the borehole; at least one processing unit for selecting electric and/or magnetic field values measured by the downhole tool at the positions and/or times for which the values are stored in the memory unit, and for minimizing errors between the stored and selected values; and means for outputting data on the evaluated shape of the fractures in the rock formation.

Further aspects of the invention provide: (i) a computer program for determining the geometry of a hydraulic fracture in a rock formation from measured values of electric or magnetic fields or both electric and magnetic fields generated by the flow of a fracturing fluid between the fracture and the rock formation; and (ii) a computer program product carrying such a program.

BRIEF DESCRIPTION OF THE DRAWINGS

Specific embodiments of the present invention will now be described with reference to the following drawings in which.

DETAILED DESCRIPTION OF THE INVENTION

Figure 1B:
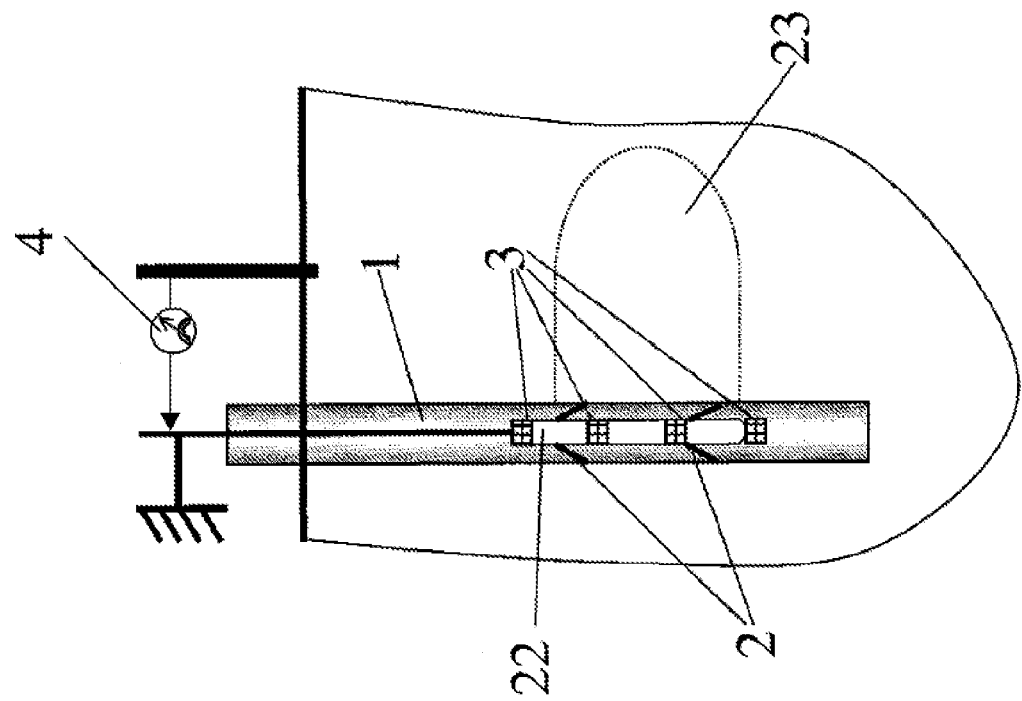
FIG. 1b is a schematic diagram showing a borehole with a fixed sensor arrangement.
Figure 1A:
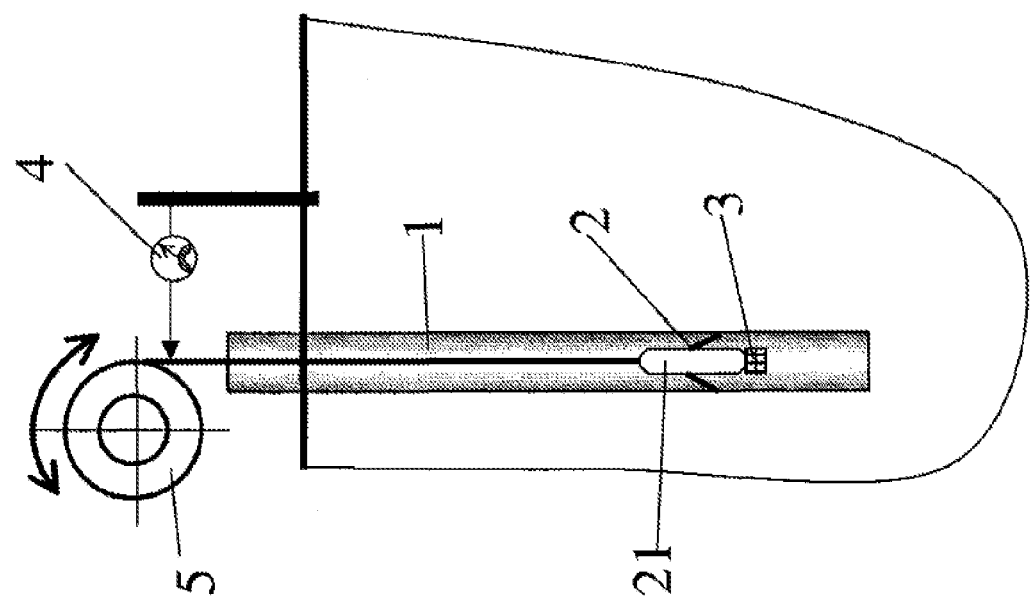
FIG. 1a is a schematic diagram respectively showing a borehole with a movable sensor arrangement.

FIG. 1a is a schematic view of a borehole 1 with a sensor arrangement associated with a downhole tool 21 which comprises electric field sensors 2 and magnetic field sensor 3. The electric field sensors 2 are voltage electrodes which contact the borehole and the magnetic field sensor 3 is a magnetometer, such as a high-precision nuclear magnetic resonance device of the type provided, for example, by Schlumberger. Examples of suitable electrodes and magnetometers are described in: U.S. Pat. No. 5,642,051 and U.S. Pat. No. 6,441,618 for electrodes behind casing; EP0544583 and EP0715187 for electrodes on a wireline tool in openhole; and U.S. Pat. No. 6,597,178B1 and Etchecopar et al. (1993), *Harnessing Paleomagnetics for Logging*, Oilfield Review, October 1993, Volume 5, Number 3 for magnetometers. The sensor arrangement 21 is movable along the borehole by means of a drive 5, thus providing measurement of electric and magnetic fields in different parts of the borehole 1. In this example, measurement processing means 4 is outside the borehole. The sensor arrangement comprises two voltage electrodes and one magnetic field sensor 3, but the number of sensors may be selected depending on the particular implementation requirements.

FIG. 1b shows a fixed sensor arrangement 22 which comprises a plurality of electric field sensors 2 and magnetic field sensors 3. The number and spacing of the sensors along the borehole may be such as to provide measurements above and below the predicted positions of formation boundaries. It will be apparent to those skilled in art that the locations of sensors 2 and 3 in the fixed arrangement may be adjusted as required.

Figure 2:
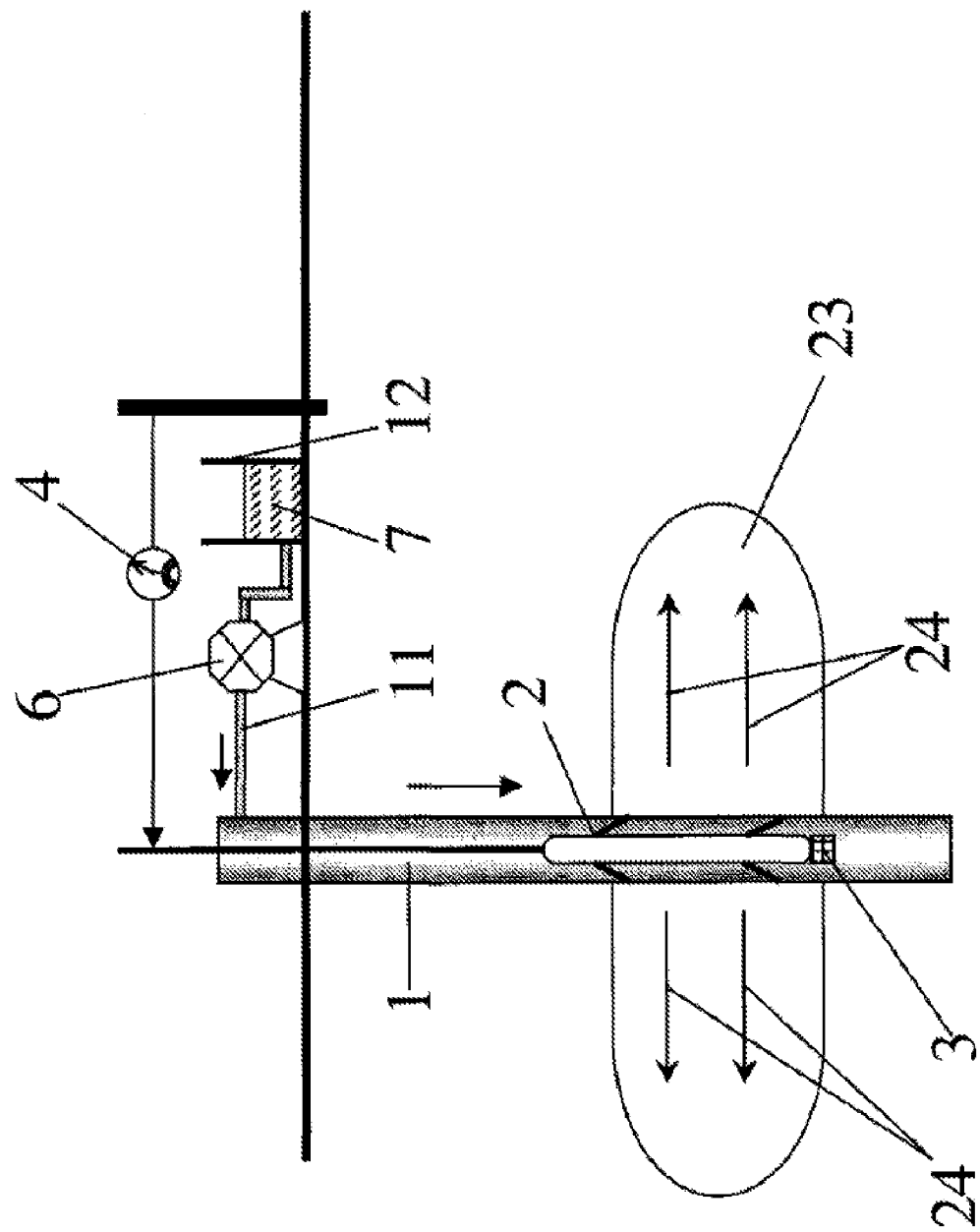
FIG. 2 is a schematic diagram showing an embodiment according to the invention.

An example of the invention is shown in the schematic diagram on FIG. 2. In addition to the sensor arrangement which is placed in the borehole 1, the apparatus comprises pump 6 connected by channel 11 to the borehole 1. The pump 6 is also connected to a reservoir 12 which is filled with fracturing fluid 7. Fracturing fluid 7 is an electrolyte-based, and is generally either a high viscosity (crossed-linked or uncrossed-linked) polymer fluid, or a surfactant-based fracturing fluid. The sensor arrangement may be either movable or fixed as described above. The surface pump 6 may be also provided with a pressure controlling unit (not shown) to continuously increase or decrease the pressure in the borehole.

The pump 6 injects fluid 7 into the borehole 1 through channel 11. Fluid 7 is injected at a pressure which is high enough to create a fracture 23 in the formation penetrated by the borehole whereby the fluid flow into the fracture and into the formation around the borehole. Flow of the fluid 7 into the fracture is indicated schematically by arrows 24.

Flow of the fluid 7 into the fractures and the formation generates an electromagnetic field which is detected by electric field sensors 2 and magnetic field sensor 3. Measurement processing means 4 then processes the signals received from the sensors 2 and 3 to provide their output in a suitable form, i.e. as intermediate information for further processing or as final information. Output received from the processing means 4 allows evaluation of the fracture geometry.

Figure 3:
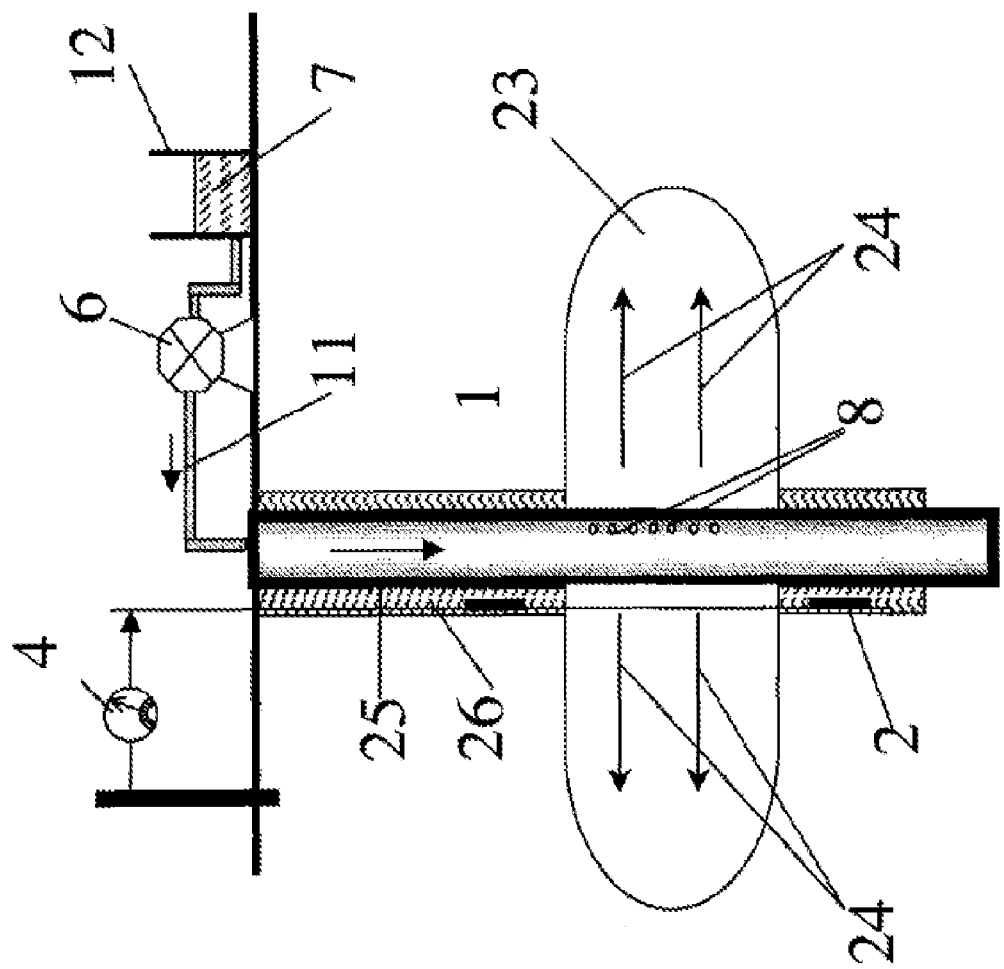
FIG. 3 is a schematic diagram showing a borehole with perforated casing and cemented sensors.

Many boreholes used for oil or gas production are cased inside, the casing being perforated to allow produced oil to enter the borehole. Such situation is shown in FIG. 3 where borehole 1 has casing 25 with perforations 8. The casing can be made of different materials, but the most commonly used casing material is steel. However, to provide reliable and accurate measurements by magnetic field sensors, the magnetic field measurement should be made in an open (uncased) section of the borehole or in a cased section if the casing does not strongly disturb the magnetic field (a composite casing, for example).

It is preferable, but not essential, that the electric field is also measured in an open or non-metallic cased section of the borehole. However, if necessary the electric field can be successfully measured by sensors embedded in the cemented outer annulus 26 with which the casing is insulated, as shown in FIG. 3.

Figure 4:
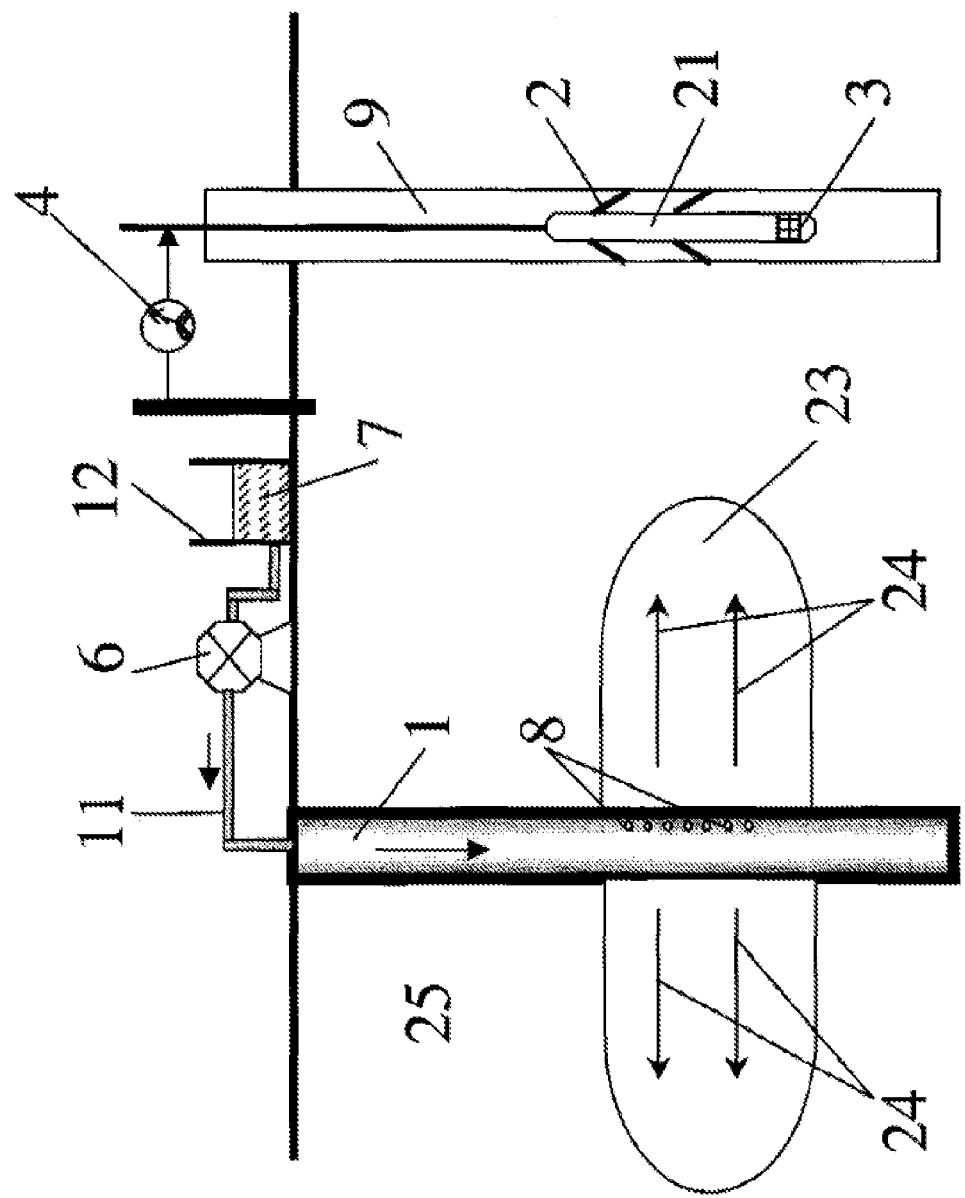
FIG. 4 is a schematic diagram showing an embodiment for two boreholes according to the invention.

In situations when the casing 25 does not allow the sensor arrangement to be successfully used within the borehole, the method according to the invention can be implemented using a different borehole located near the first borehole 1. The implementation of such a method is shown schematically in FIG. 4. Fracturing fluid 7 is injected by pump 6 into the borehole 1 which has casing 25 with perforations 8. Another borehole 9, in which is placed the sensor arrangement 21, is located near the first borehole 1. As described above, the sensor arrangement 21 comprises voltage electrodes 2 in contact with the borehole and a high precision magnetometer 3. Such devices can measure the induced electric and magnetic fields up to about 100 to 500 meters from the borehole in which the fluid is injected. If necessary, a number of boreholes located around the borehole 1 within a range of about 500 meters can each be used for receiving a sensor arrangement 21 (movable or fixed) and obtaining corresponding measurements.

Figure 5:
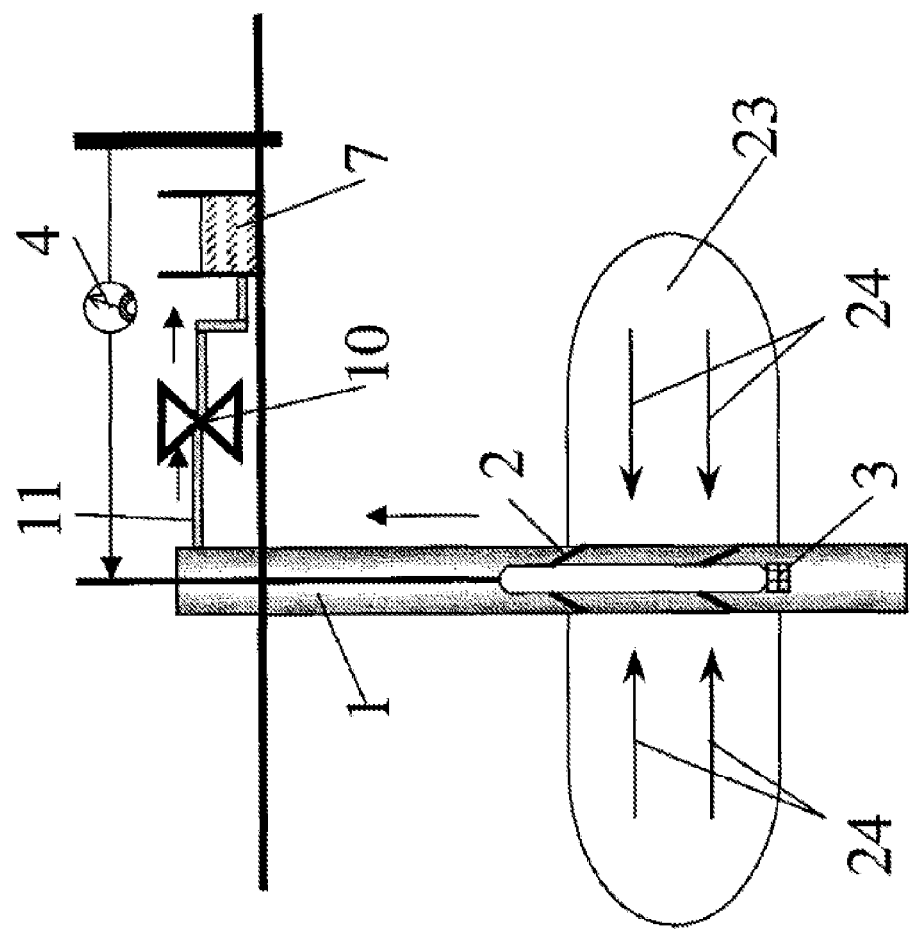
FIG. 5 is a schematic diagram showing another embodiment according to the invention.

Measurable electric and magnetic fields are generated not only by the flow of pressurized injected fluid into rock formations penetrated by the borehole, but also by backflow of the fracturing fluid, i.e. when it retreats into the borehole from the created fractures. This situation takes place when the pressure inside the borehole 1 is reduced, for example by means of valve 10, to a value equal or below the pressure of the fracturing fluid 7 in the formations and fractures. This backflow is schematically shown in FIG. 5 by the reversal of arrows 24. Such back flow of fluid 7 generates measurable electric and magnetic fields which can be detected by electric field sensors 2 and magnetic field sensors 3. The signals from the sensors are supplied to measurement processing means 4 as described above with reference to FIG. 2.

Figure 6:
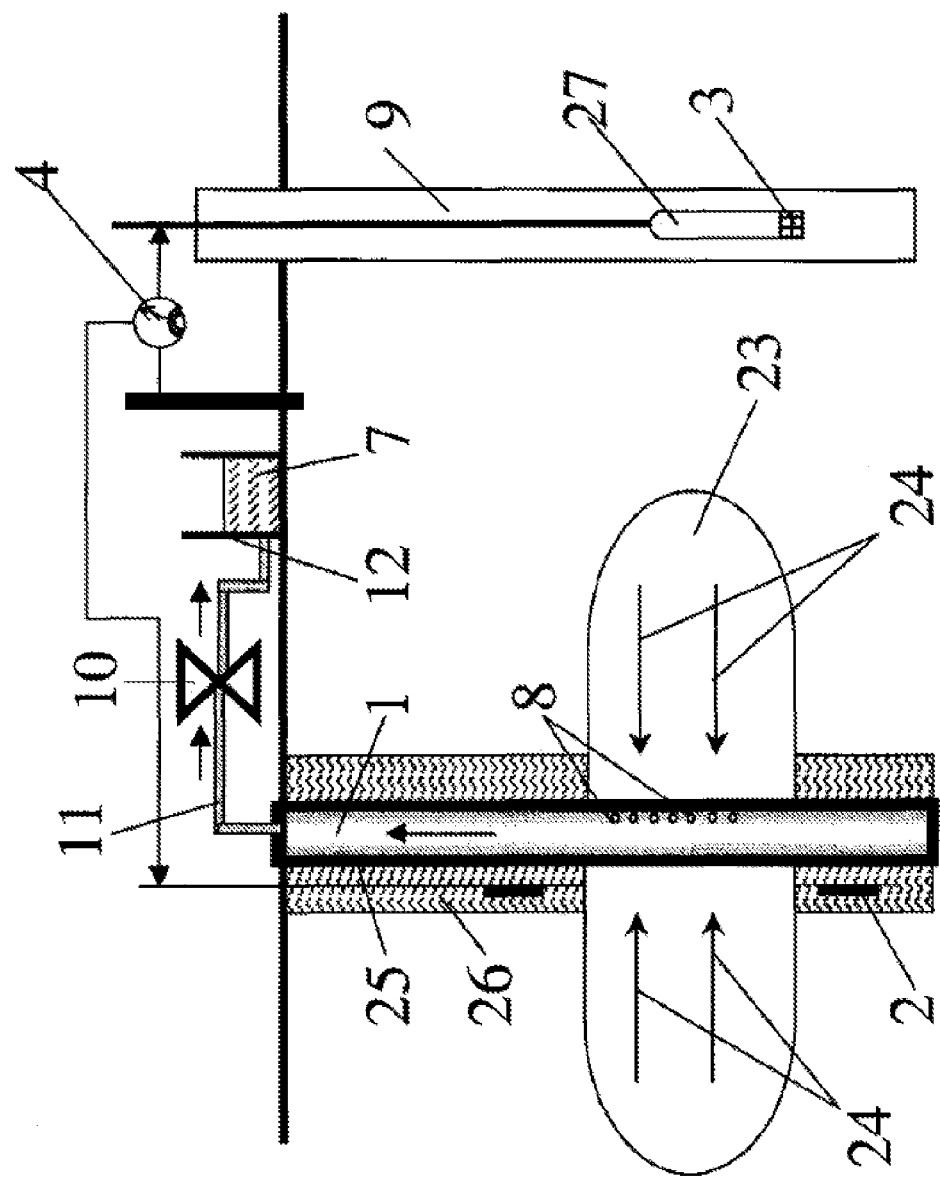
FIG. 6 is a schematic diagram showing yet another embodiment according to the invention.

FIG. 6 shows schematically an example of the invention, in which the borehole 1 is cased and the casing 25 has perforations 8. Cemented annulus 26 is provided around the casing 25 and a number of electric field sensors 2 are embedded in the annulus 26. Magnetic field sensors 3 are attached to a sensor arrangement 27 which is either movably or fixedly located in another borehole 9 situated from the borehole 1 at a distance allowing the sensors 3 to detect the magnetic field induced by fracturing liquid flowing back from fractures into the borehole 1 when valve 10 reduces the pressure inside the borehole 1. The signals from the sensors are supplied to measurement processing means 4 as described above with reference to FIG. 2.

The above examples described with references to FIG. 1 to 6 may be implemented in various combinations, for example, a number of sensor arrangements 21 or 27 may be movably or fixedly located in boreholes surrounding the borehole 1 in which fracturing fluid 7 is injected or flowing back from the created fractures. Such combinations may allow measurements to be taken simultaneously around the borehole 1.

As an alternative, a sensor arrangement 21 or 27 can be placed sequentially in the boreholes encircling borehole 1. In further embodiments fixed and movable sensor arrangements 21 or 27 may be located in one and the same borehole.

Figure 7:
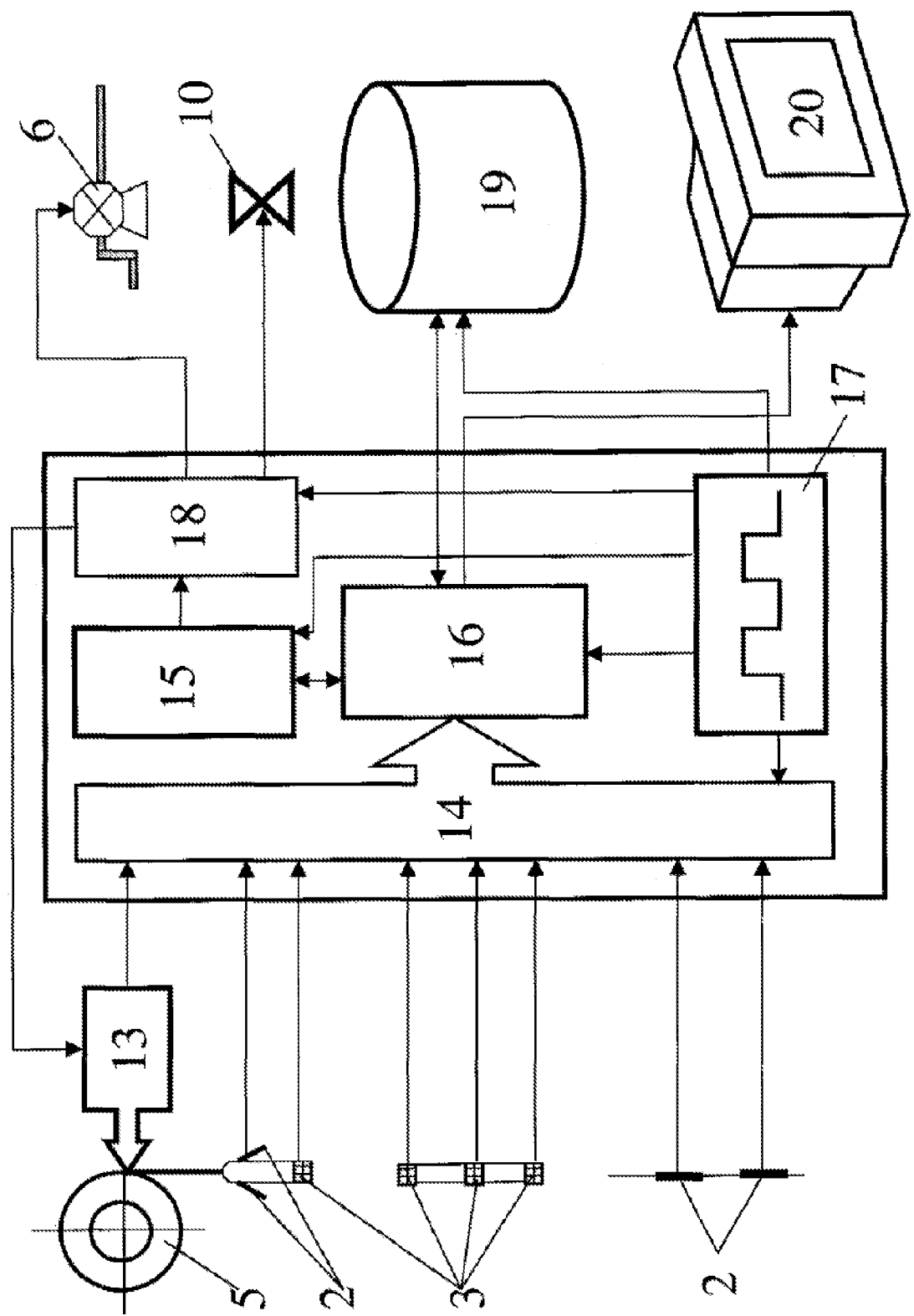
FIG. 7 is a block diagram of an apparatus according to one embodiment of the invention.

A general block diagram of an exemplary apparatus for implementing the method is shown in FIG. 7. In the exemplary apparatus, signals from sensors 2 and 3 and from drive 13 are supplied to converting unit 14. Converting unit 14 outputs the signals in a form suitable for their further processing and storing in digital form in random-access memory (RAM) 16 and in data/program memory (DPM) 19. DPM 19 stores programs for implementing modelling calculations. Processing unit 15 receives data from RAM 16 and performs calculations to produce output information and signals to control pump 6, valve 10 and drive 13 by means of controlling unit 18. Output information from processing unit 15 is stored in RAM 16 and DPM 19. Output data may also be monitored at display unit 20. Synchronization and internal timing for the described units is provided by a clocking unit 17.

The method of the invention may be implemented by providing a model of an electric or magnetic field distribution for a given fracture geometry and downhole pressure and evaluating the geometry of the fractures in the rock formations by minimizing errors between the model of electric and magnetic field distributions and the corresponding downhole measured distributions.

The model provides field distributions based on the following equations. The electrokinetic effect involves the generation of an electric current by fluid flow through porous media (the reverse effect involves inducing flow through the application of an electric field). Its primary cause is the difference in mobility of ions, some of which are fixed at the surface of the solid skeleton (matrix) of the porous medium, while dissolved counter ions move with the pore fluid (or force it to move, if an electric field is applied). Macroscopically, the flow and electric current are described by the equations:

$$u = -\frac{k}{\eta_f}\nabla p + \beta\nabla\psi \tag{1}$$

$$j = -S(\nabla\psi - C\nabla p), C = \frac{\alpha}{S} \tag{2}$$

in which $\kappa$ is the reservoir permeability, $n_f$ is the reservoir fluid conductivity, p is the fluid pressure, $\psi$ is the electrokinetic potential, S is the rock electric conductivity, and C is the electro-kinetic coupling coefficient.

The Onsager relation holds between the coupling coefficients C and $\beta$:

$$\beta = \alpha = CS \tag{3}$$

The magnetic field generated by the flow-induced current can be evaluated generally using Biot-Savart's law. However, for the specific case considered, it is more convenient to use an expression for the magnetic induction vector B in terms of the vector potential A:

$$B = [\nabla \times A] \tag{4}$$

where the vector potential satisfies the equation (in SI units):

$$\Delta A = -\mu j \tag{5}$$

The model of electric field and magnetic field distributions is calculated by solving the equations above taking account of conservation laws, boundary conditions, symmetry consideration and Fourier transform used. The model can also take into account the influence of several formation layers.

Figure 8:
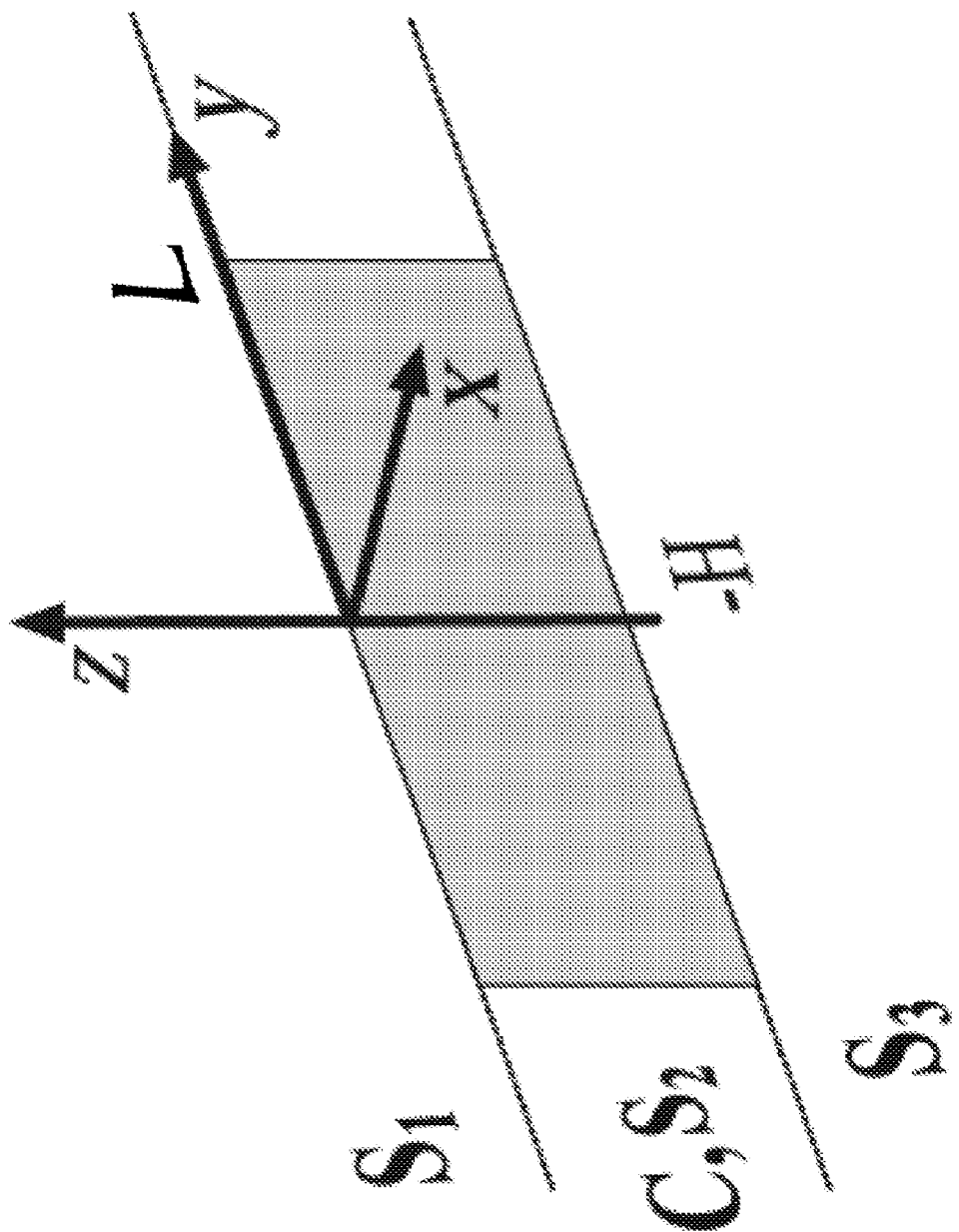
FIG. 8 is a schematic diagram showing a formation comprising three layers

An example application is illustrated below during production from a reservoir. The formation is composed of three layers $S_1$, $S_2$ and $S_3$, as shown in FIG. 8, and the electric conductivities of the layers, which have been previously measured with conventional resistivity wireline logs, are respectively about 0.001, 0.1 and 0.001 in Siemens/m. The fracture is entirely in the reservoir (i.e. layer $S_2$) and is of height H and length 2 L as shown in FIG. 8. The following dimensionless parameters are used:

$$H^* = H/L \tag{6}$$

$$X^* = x/L$$

$$Y^* = y/L$$

$$Z^* = z/L$$

Figure 9B:
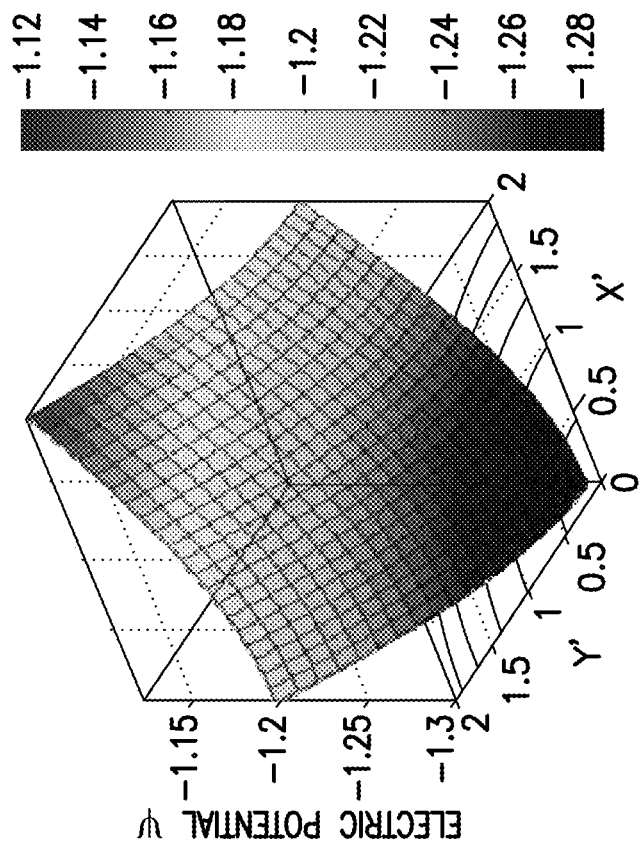
FIGS. 9a and b are three-dimensional plots showing distributions of electric potential as a function of horizontal position coordinates and depth.
Figure 9A:
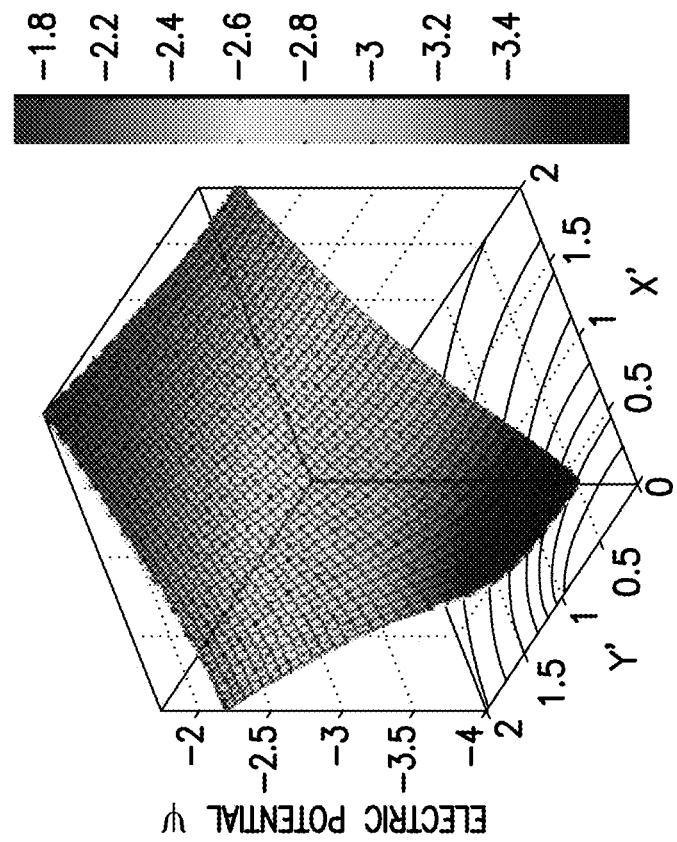

FIGS. 9a and 9b show the expected electric potential predicted by the model as a function of $X^*$ and $Y^*$ at two different measurement depths ($Z^*$). The distributions shown in these figures have characteristic lengths related to the fracture length and fracture height, and an anisotropy related to fracture direction.

The real distributions of electric and magnetic fields generated by fracturing fluid flow in the borehole and fracture are revealed by downhole measuring these fields at the same positions and times of measuring as used for calculating the model of the electric or magnetic field distributions. The measured distributions are also referred to as "observed electric or magnetic field distributions". The orientation, length and height of the fracture are adjusted in the forward model until minimization of the difference between the model values and the measured values is achieved. In this way, the orientation, length and height of the fracture can be determined.

The model described provides a method to estimate a value of the normalized potential since it provides a relationship between the induced voltage, the electrokinetic coupling coefficient and the differential pressure from a knowledge of the thickness, depth and electrical resistivity, and from an assumption about the fracture shape:

$$\bar{\psi} \approx \frac{\psi}{C\Delta P} \tag{7}$$

where $\psi$ is the induced voltage measured at a given location, C, the electrokinetic coupling coefficient referred later to as the coupling coefficient, $\Delta P$ the differential pressure between the injection pressure at the fracture mouth and the far-field reservoir pressure and $\overline{\psi}$ the normalized induced voltage predicted by the model. For the sake of simplicity we assume that $\overline{104}$ does not depend on $\Delta P$, but in practice one might expect some influence. The minimum requirement to have a detectable signal depends mainly on the background noise and the quality of the measurement device, but as a first approximation we take that ψ must be at least equal to 0.1 mV to have a detectable signal since a value of order of 0.1 mV approximately corresponds to the noise level during field measurements.

As an example, in one of the field cases for fracture of half-length L in a four-well configuration at the small reservoir depth d (d/L=5), small reservoir\fracture height H (H/L=0.05) and rather weakly conductive top- and bottom rocks (i.e. small ratio of conductivities, $\sigma_3/\sigma_2=\sigma_1/\sigma_2=10^{-4}$) it was found that maximum $\overline{\psi}$ at the surface is of the order of 5 (any other location, for example in a borehole, could have been taken). If C is taken as 1 mV/MPa we need at least a $\Delta P$ of 0.02 MPa.

During injection, the fracturing pressure is given by the value of closure stress (far-field minimum stress) plus an excess pressure (the net pressure) which is a function of the fluid viscosity, pump rate and fracture geometry. The $\Delta P$ is given by the difference between the fracturing pressure and the far-field pore pressure.

Estimates of these terms are given below, but obviously strong deviation is expected to be observed from field to field.

The pore pressure gradient is 0.01 MPa/m, the minimum stress gradient is 0.016 MPa/m, the net pressure is variable but could be of the order of 4 MPa.

For an injection at 1000 m deep $\Delta P=16+4-10=10$ MPa

The maximum value of signal in the case mentioned above is thus 50 mV.

According to (7), the observed values of electrokinetic potential are proportional to the coupling coefficient C. The coupling coefficient, on the other hand, strongly depends on the pore fluid conductivity and hence salinity, and on the brine acidity and hence prevalent ions in solution. Generally, C decreases with the fluid conductivity and increases with pH.

Above value (C=1 mV/MPa) for the coupling coefficient is typical for sandstone saturated with brine, with a brine concentration of the order of 0.2 Mol/L of NaCl. For this value the electrical resistivity of the fluid is 0.5 Ohm.m.

The electrical resistivity of the fluid is a key parameter. For sea water, which can be viewed as a low resistivity fluid, the brine concentration is about 0.48 Mol/L with a resistivity of about 0.2 Ohm.m. Water to qualify as drinking water must have an electrical resistivity less than 200 Ohm.m. Degassed water has an electrical resistivity of about 8000 Ohm.m. All these data correspond to measurements taken at room temperature.

As a very first approximation published data for a typical sandstone show that C (in mV/MPa) is about equal to 10 R (in $\Omega$. m). These data show that the coupling coefficient is a strong function of fluid resistivity R. It is therefore advantageous to use a fracturing fluid which is an electrolyte with a low concentration of salt to have a high electrical resistivity. One can also see that since one can easily change the water resistivity by several order of magnitudes by increasing or decreasing the salt concentration, one can change the coupling coefficient by several order of magnitude during a fracturing job. This will create similar variation of the induced voltage.

Another aspect is the fluid saturating the reservoirs. Most oil and gas reservoirs contain some water. This water is in most of the cases a brine, with at least a concentration close that of the sea water, although salt concentration up to 3 Mol/Liter and below 0.05 Mol/L have been reported in some fields. It is advantageous to create strong variation between the formation fluid and in fracturing fluid, allowing, in some cases, to determine the interface between the fracture fluid and the formation fluid. To achieve this, it is required to have a fracturing fluid of different resistivity (or difference salt concentration) than the formation fluid. The fracturing fluid can be more or less resistive than the formation fluid. Strictly speaking we are looking at changing the coupling coefficient by changing the salinity. This coefficient can also be changed by changing the pH.

This aspect demonstrates the key difference between this invention and the method proposed by Hocking et al. (U.S. Pat. No. 6,330,914), where a fracturing fluid with a low resistivity must be injected since it only acts as an "electrified sheet" and which is energized from the surface by an alternating electrical source. Hocking et al recommend the use of a fluid 20 times more conductive than the surrounding medium, and suggest the addition of salt to achieve this low resistivity. In our method a very low resistive fluid will result in a non-measurable signal. In our example mentioned above a fluid and rock system with a coupling coefficient 0.02 mV/MPa will result in a total lack of measurable signal during a fracturing job, since the maximum value of the signal will be of the order of the noise.

Other parameters affecting the value of the coupling coefficient include the pH and the viscosity of the fluid. Basic fluids have a higher value of the coupling coefficient than an acid fluid, and low viscosity fluids have a higher value of the coupling coefficient than high viscosity fluids.

It is therefore proposed to use a fluid resistivity and a pH which are high enough to ensure that a signal can be recorded on the surface or from the sensors located in the wellbore used to inject the fracturing fluid or in adjacent wellbores. One could also play with the fluid viscosity, however fluid viscosity also influences the fracturing pressure and fracture width.

Changing the pump rate will change the injection pressure, therefore change the induced voltage. We can also change the pump rate, increasing or decreasing, during the injection, to record change of the induced voltage. We could also send a pressure pulse, which will flow inside the fracture and create a local change of pressure inside the fracture, such a current generation propagating with the pressure pulse will be created.

During fracture propagation if proppant bridging occurs (when proppant form a solid pack at given location within the fracture, and often at the tip of the fracture when the proppant concentration is high enough), some signal could be emitted due to the flow of the fracturing fluid thought the proppant. During production, similarly, some signal could be emitted due to the flow of either the fracturing fluid, the filtrate or the formation fluid, if the formation fluid has the proper properties, through the proppant pack. The nature of the proppant is very important. Proppant based on sand grains or glass beads contains charged particles so like sandstones is able to lead to a good value of the coupling coefficient while proppant based on ceramic grain will lead to a negligible value of the coupling coefficient, since ceramic particles are not charged. Thus it is advantageous to use one type or another type of proppant depending on whether one wants to have signal from the flow within the packed fracture. One could also change the proppant type during a fracturing job.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All the references mentioned herein are hereby incorporated by reference.

What is claimed is:

1. A method of evaluating a geometry of a hydraulic fracture in a rock formation penetrated by a borehole, comprising the steps of:
    placing a number of electric field sensors or magnetic field sensors or both electric and magnetic field sensors inside or around the borehole;
    injecting into the borehole an electrolyte-based fracturing fluid at a pressure high enough to allow the fluid to create the fracture in the formation penetrated by the borehole and to flow from the borehole into the fracture and from the fracture into the formation, and having a fluid resistivity and a pH high enough to ensure that a detectable electromagnetic field is generated by the flow of the fracturing fluid due to the electrokinetic effect;
    measuring the values of electric or magnetic fields, or both electric and magnetic fields generated by the flow of the fracturing fluid from the borehole into the fracture and from the fracture into the formation due to the electrokinetic effect; and
    determining the geometry of the fracture from the measured values.

2. The method of claim 1, wherein the electric field sensors or magnetic field sensors or both electric and magnetic field sensors are placed on the earth's surface above the borehole.

3. The method of claim 1, wherein the electric field sensors or magnetic field sensors or both electric and magnetic field sensors are placed in an adjacent borehole.

4. The method of claim 1, further comprising the step of:
    providing a model from which expected values of the electric or magnetic fields, or both electric and magnetic fields generated due to the electrokinetic effect by the flow of the fracturing fluid from the borehole into the fracture and from the fracture into the rock formation are calculated at the same positions or same times, or both same positions and times as that of the measured values for various fracture geometries and injection pressures;
    wherein the geometry of the fracture is determined by adjusting the model to minimize the discrepancy between the expected and measured values.

5. A method of evaluating a geometry of a hydraulic fracture in a rock formation penetrated by a borehole, comprising the steps of:
    placing a number of electric field sensors or magnetic field sensors or both electric and magnetic field sensors inside or around the borehole;
    injecting into the borehole an electrolyte-based fracturing fluid at a pressure high enough to allow the fluid to create the fracture in the formation penetrated by the borehole and to flow from the borehole into the fracture and from the fracture into the formation so that an electromagnetic field is generated by the flow of the fracturing fluid due to the electrokinetic effect;
    varying the injection pressure to ensure that the electromagnetic field can be detected by the electric field sensors or magnetic field sensors or both electric and magnetic field sensors,
    measuring the values of electric or magnetic fields, or both electric and magnetic fields generated by the flow of the fracturing fluid from the borehole into the fracture and from the fracture into the formation due to the electrokinetic effect; and
    determining the geometry of the fracture from the measured values.

6. The method of claim 5, wherein the injection pressure is varied by changing the pump rate.

7. The method of claim 5, wherein the injection pressure is varied by changing the fracturing fluid viscosity.

8. The method of claim 5, wherein the electric field sensors or magnetic field sensors or both electric and magnetic field sensors are placed on the earth's surface above the borehole.

9. The method of claim 5, wherein the electric field sensors or magnetic field sensors or both electric and magnetic field sensors are placed in an adjacent borehole.

10. The method of claim 5, further comprising the step of:
    providing a model from which expected values of the electric or magnetic fields, or both electric and magnetic fields generated due to the electrokinetic effect by the flow of the fracturing fluid from the borehole into the fracture and from the fracture into the rock formation are calculated at the same positions or same times, or both same positions and times as that of the measured values for various fracture geometries and injection pressures;
    wherein the geometry of the fracture is determined by adjusting the model to minimize the discrepancy between the expected and measured values.

11. A method of evaluating a geometry of a hydraulic fracture in a rock formation penetrated by a borehole, comprising the steps of:
    placing a number of electric field sensors or magnetic field sensors or both electric and magnetic field sensors inside or around the borehole;
    injecting into the borehole an electrolyte-based fracturing fluid with a given salinity and a given pH at a pressure high enough to allow the fluid to create the fracture in the formation penetrated by the borehole and to flow from the borehole into the fracture and from the fracture into the formation so that an electromagnetic field is generated by the flow of the fracturing fluid due to the electrokinetic effect;
    varying the value of the electrokinetic coupling coefficient of the fracturing fluid while flowing in the formation by changing the salinity of the fracturing fluid during the fracturing job to ensure that the electromagnetic field can be detected by the electric field sensors or magnetic field sensors or both electric and magnetic field sensors,
    measuring the values of electric or magnetic fields, or both electric and magnetic fields generated by the flow of the fracturing fluid from the borehole into the fracture and from the fracture into the formation due to the electrokinetic effect; and
    determining the geometry of the fracture from the measured values.

12. The method of claim 11, wherein the electrolyte-based fracturing fluid is a high electric resistivity fluid.

13. The method of claim 11, wherein the electric field sensors or magnetic field sensors or both electric and magnetic field sensors are placed on the earth's surface above the borehole.

14. The method of claim 11, wherein the electric field sensors or magnetic field sensors or both electric and magnetic field sensors are placed in an adjacent borehole.

15. The method of claim 11, wherein the salinity of the fracturing fluid is changed by increasing the salt concentration in the fracturing fluid during the fracturing job.

16. The method of claim 11, wherein the salinity of the fracturing fluid is changed by decreasing the salt concentration in the fracturing fluid during the fracturing job.

17. The method of claim 11, wherein the value of the electrokinetic coupling coefficient of the fracturing fluid while flowing in the formation is higher than that of the coupling coefficient of the formation fluid.

18. The method of claim 11, wherein the value of the electrokinetic coupling coefficient of the fracturing fluid while flowing in the formation is lower than that of the coupling coefficient of the formation fluid.

19. The method of claim 11, wherein the pressure in the borehole is varied to ensure that the electromagnetic field is detectable by the electric field sensors or magnetic field sensors or both electric and magnetic field sensors.

20. The method of claim 11, wherein the salinity of the fracturing fluid is changed by injecting an additional fracturing fluid with a salinity different from that of the original one.

21. The method of claim 11, wherein the salinity of the fracturing fluid is changed step by step during the fracturing job.

22. The method of claim 11, further comprising the step of:
providing a model from which expected values of the electric or magnetic fields, or both electric and magnetic fields generated due to the electrokinetic effect by the flow of the fracturing fluid from the borehole into the fracture and from the fracture into the rock formation are calculated at the same positions or same times, or both same positions and times as that of the measured values for various fracture geometries and injection pressures;
wherein the geometry of the fracture is determined by adjusting the model to minimize the discrepancy between the expected and measured values.

23. A method of evaluating a geometry of a hydraulic fracture in a rock formation penetrated by a borehole, comprising the steps of:
placing a number of electric field sensors or magnetic field sensors or both electric and magnetic field sensors inside or around the borehole;
injecting into the borehole an electrolyte-based fracturing fluid with a given salinity and a given pH at a pressure high enough to allow the fluid to create the fracture in the formation penetrated by the borehole and to flow from the borehole into the fracture and from the fracture into the formation so that an electromagnetic field is generated by the flow of the fracturing fluid due to the electrokinetic effect;
varying the value of the electrokinetic coupling coefficient of the fracturing fluid while flowing in the formation by changing the pH of the fracturing fluid during the fracturing job to ensure that the electromagnetic field can be detected by the electric field sensors and magnetic field sensors or both electric and magnetic field sensors;
measuring the values of electric or magnetic fields, or both electric and magnetic fields generated by the flow of the fracturing fluid due to the electrokinetic effect; and
determining the geometry of the fracture from the measured values.

24. The method of claim 23, wherein the electric field sensors or magnetic field sensors or both electric and magnetic field sensors are placed on the earth's surface above the borehole.

25. The method of claim 23, wherein the electric field sensors or magnetic field sensors or both electric and magnetic field sensors are placed in an adjacent borehole.

26. The method of claim 23, wherein the pH of the fracturing fluid is increased during the fracturing job.

27. The method of claim 23, wherein the pH of the fracturing fluid is decreased during the fracturing job.

28. The method of claim 23, further comprising the step of:
providing a model from which expected values of the electric or magnetic fields, or both electric and magnetic fields, generated due to electrokinetic effect by the flow of the fracturing fluid from the borehole into the fracture and from the fracture into the rock formation are calculated at the same positions or same times, or both same positions and times as that of the measured values for various fracture geometries and injection pressures;
wherein the geometry of the fracture is determined by adjusting the model to minimize the discrepancy between the expected and measured values.

29. The method of claim 23, wherein the pressure in the borehole is varied to ensure that the electromagnetic field is detectable by the electric field sensors or magnetic field sensors or both electric and magnetic field sensors.

30. The method of claim 23, wherein the pH of the fracturing fluid is changed step by step during the fracturing job.

31. A method of evaluating a geometry of a hydraulic fracture in a rock formation penetrated by a borehole, comprising the steps of:
placing a number of electric field sensors or magnetic field sensors or both electric and magnetic field sensors inside or around the borehole;
injecting into the borehole an electrolyte-based fracturing fluid at a pressure high enough to allow the fluid to create the fracture in the formation penetrated by the borehole and to flow from the borehole into the fracture and from the fracture into the formation so that a detectable electromagnetic field is generated by the flow of the fracturing fluid due to the electrokinetic effect;
decreasing the pressure in the borehole thereby allowing the fluid to flow back from the formation and from the fracture into the borehole,
measuring the values of electric or magnetic fields, or both electric and magnetic fields generated by the reverse flow of the fracturing fluid from the formation and from the fracture into the borehole due to the electrokinetic effect; and
determining the geometry of the fracture from the measured values.

32. The method of claim 31, wherein the electric field sensors or magnetic field sensors or both electric and magnetic field sensors are placed on the earth's surface above the borehole.

33. The method of claim 31, wherein the electric field sensors or magnetic field sensors or both electric and magnetic field sensors are placed in an adjacent borehole.

34. The method of claim 31, further comprising the step of:
providing a model from which expected values of the electric or magnetic fields, or both electric and magnetic fields generated due to the electrokinetic effect by the reverse flow of the fracturing fluid from the formation and from the fracture into the borehole are calculated at the same positions or same times, or both same positions and times as that of the measured values for various fracture geometries and injection pressures;
wherein the geometry of the fracture is determined by adjusting the model to minimize the discrepancy between the expected and measured values.

35. The method of claim 31, wherein the electric field sensors or magnetic field sensors or both electric and magnetic field sensors are placed on the earth's surface above the borehole.

36. The method of claim 31, wherein the electric field sensors or magnetic field sensors or both electric and magnetic field sensors are placed inside an adjacent borehole.

37. The method of claim 31, wherein at least one positive pressure pulse of a given magnitude is applied to the fracturing fluid so that the electro-magnetic field is generated by the flow of the fracturing fluid from the borehole into the fracture and from the fracture into the formation due to the electrokinetic effect.

38. The method of claim 31, wherein at least one negative pressure pulse of a given magnitude is applied to the fracturing fluid so that the electro-magnetic field is generated by the reverse flow of the fracturing fluid from the formation and from the fracture into the borehole due to the electrokinetic effect.

39. The method of claim 31, further comprising the step of:
providing a model from which expected values of the electric or magnetic fields, or both electric and magnetic fields generated, due to the electrokinetic effect, by the flow of the fracturing fluid from the borehole into the fracture and from the fracture into the rock formation are calculated at the same positions or the same times, or both same positions and times as that of the measured values for various fracture geometries and injection pressures;
wherein the geometry of the fracture is determined by adjusting the model to minimize the discrepancy between the expected and measured values.

40. The method of claim 31, further comprising the step of applying a second pressure pulse with a magnitude different from that of the first one.

41. The method of claim 31, further comprising the step of applying a second pressure pulse opposite in sign to the first one.

42. The method of claim 31, further comprising the step of changing the salinity before applying a second pressure pulse.

43. A method of evaluating a geometry of a hydraulic fracture in a rock formation penetrated by a borehole, comprising the steps of:
placing a number of electric field sensors or magnetic field sensors or both electric and magnetic field sensors inside or around the borehole;
injecting into the borehole an electrolyte-based fracturing fluid with a given salinity and a given pH at a pressure high enough to allow the fluid to create the fracture in the formation penetrated by the borehole and to flow from the borehole into the fracture and from the fracture into the formation;
applying at least one pressure pulse of a given magnitude to the fracturing fluid under pressure that is sufficient to generate an electromagnetic field by the flow of the fracturing fluid, due to the electrokinetic effect;
measuring the values of electric or magnetic fields, or both electric and magnetic fields generated by the flow of the fracturing fluid due to the electrokinetic effect; and
determining the geometry of the fracture from the measured values.

* * * * *